United States Patent Office

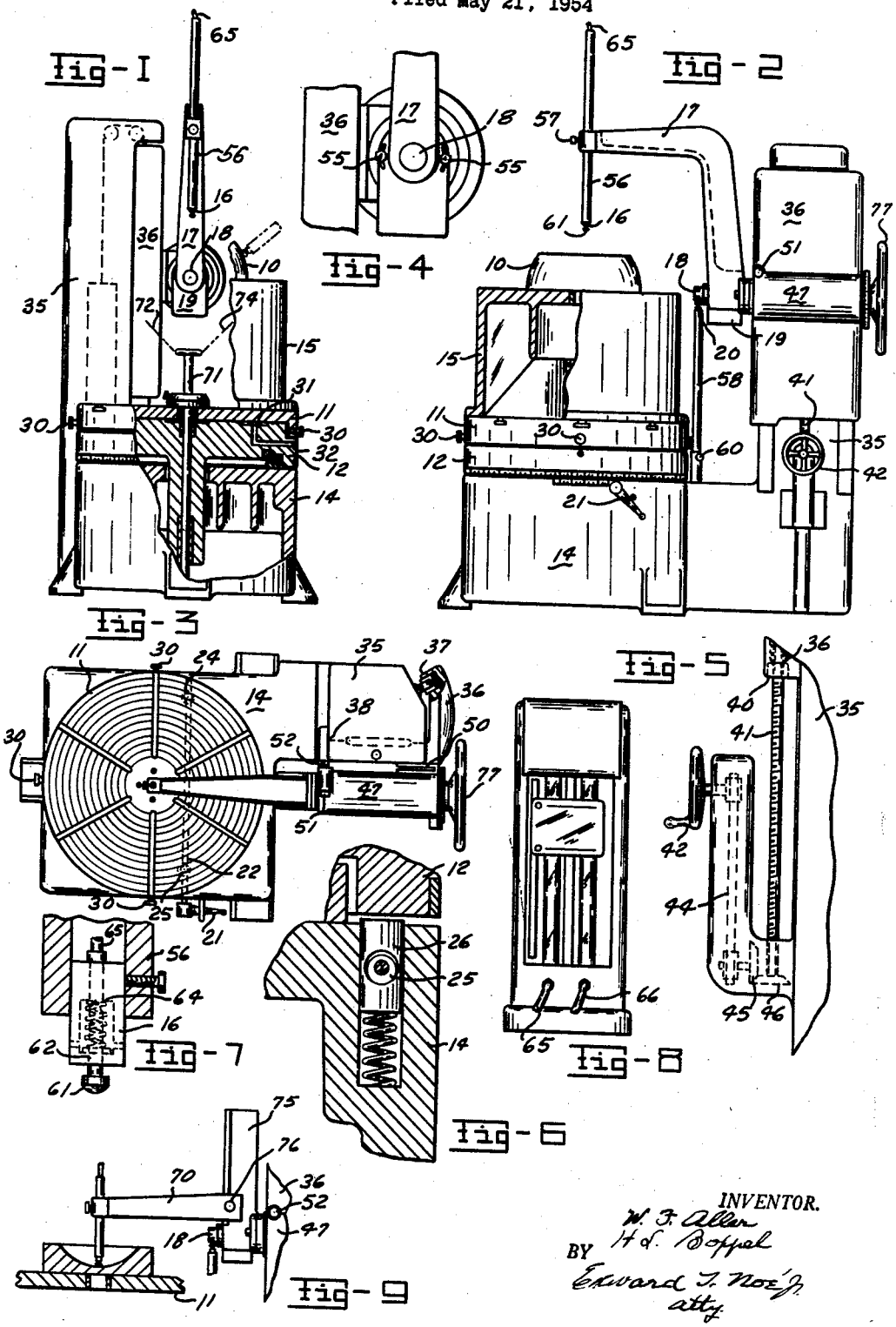

2,941,300
Patented June 21, 1960

2,941,300
GAUGING DEVICE

Willis Fay Aller and Henry L. Boppel, Dayton, Ohio, assignors, by mesne assignments, to The Sheffield Corporation, a corporation of Delaware Filed May 21, 1954, Ser. No. 431,372

7 Claims. (Cl. 33—174)

This invention relates to an apparatus for gauging arcuately curved surfaces on a part.

It is an object of this invention to provide an apparatus for accurately determining the disposition of the center of curvature of an arcuately curved part surface relative to a reference surface of the part.

It is a further object to provide an apparatus for gauging both the radius of curvature of a surface on a part and the disposition of the center of surface curvature relative to the part, such apparatus being adapted for gauging spheres, segments of spheres, templates and the like.

It is a further object to provide an apparatus for gauging curved part surfaces, which apparatus is adaptable for gauging the radius of curvature of both convexly and concavely curved part surfaces.

It is a further object to provide an apparatus of the character referred to comprising two gauging means, a first gauging means carried for movements about a pivot axis while in association with the part surface and a second gauging means for gauging the necessary adjustments in placing the pivot axis through the center of surface curvature, at which time the first gauging means responds to the radius of surface curvature and the second gauges the disposition of the center of surface curvature relative to the part.

Other objects and advantages of the invention will be apparent from the following description, the appended claims, and the accompanying drawing, in which, Figure 1 is an end view of an exemplary apparatus embodying the features of the present invention adjustable for gauging both convexly and concavely curved surfaces and shown with its base and turntable arrangement in partial central vertical section, Figure 2 is a side view of the apparatus of Figure 1, Figure 3 is a plan view of the apparatus, Figure 4 is a detailed fragmentary view of the attachment structure for the gauge head carrying arm, Figure 5 is a detailed fragment of the manual adjustment for the elevation of the gauge head pivot shaft, Figure 6 is a fragmentary section through one component of the brake means for the rotatable turntable, Figure 7 illustrates an exemplary gauge head suitable for use in practicing the present invention, Figure 8 discloses an available gauging instrument particularly suitable for use with the apparatus of this invention, and Figure 9 is a detailed fragment illustrating a modified gauge head carrying means shown as applied to gauging a concavely curved surface.

The apparatus of this invention is provided for the precise gauging of the radius of curvature of arcuately curved surfaces on a part and for determining the location of the center of curvature of a surface with respect to a reference surface of a part.

The part to be gauged is located in gauging position and a gauge head is swung about a pivot axis and along the part surface. The present invention provides a structure adaptable for gauging both concavely and convexly curved part surfaces. If a concavely curved surface is to be gauged the gauge head is positioned at one side of the pivot axis with its sensing means directed away from the axis for movement along such a surface; in gauging a convexly curved surface the gauge head is at the other side of the axis. An indicating means is connected to the gauge head and continuously responds thereto. The part and gauge head pivot axis are relatively adjustable. As the gauge head traverses the part surface if the response of the indicating means is not uniform suitable relative adjustments are made until the pivot axis extends through the center line of the part curvature. At that time the indicating means response will be uniform throughout the traverse. If the gauge head has been positioned and the indicating means adjusted in set-up for a predetermined indication with a part of nominal radius centered on the pivot axis and in association with the gauge head, then when the indicating response becomes constant it will indicate the actual radius of the curved surface being gauged by comparison with the nominal radius.

An additional gauging and indicating means can also be provided to gauge the relative adjustments of the part and pivot axis from a predetermined set-up relationship to a relative disposition giving a constant response of the swingably carried gauge head, thus obtaining an indication of the disposition of the center of curvature relative to some reference surface of the part.

An exemplary apparatus has been illustrated for the purpose of disclosing the features of the present invention; however, it is to be understood that this invention is not limited to the precise disclosed structure. In the following description of the illustrated apparatus similar numerals have been utilized to indicate like parts throughout the several views.

Figures 1 to 3 illustrate the apparatus as applied to the gauging of a segment of a sphere to determine the radius of curvature of the curved surfaces of the segment and the disposition of the center of curvature with respect to the segment surfaces. In such an application the part 10 is mounted on the upper surface of a table 11 carried for limited transverse adjustment on the upper surface of a turntable 12 mounted for rotation on the base 14 of the apparatus. A spacer 15 elevates and supports the segment 10 in gauging position. The gauge head for determining the radius of the curvature is indicated at 16 and is carried by an arm 17 fixed to a shaft 18 for traverse along the curved surfaces of the part. The arm has a counterbalance at 19. The axis of the shaft 18 is adjustable both vertically and horizontally and a gauge head 20 engages the shaft 18 for measuring its vertical adjustments during gauging.

The turntable 12 is carried for rotation about a vertical axis on an annular ballway and brake means are provided to lock it in position. The brake means are actuated by a handle 21 which rotates a shaft 22 carried transversely through the base 14. The shaft 22 mounts a pair of cams 24 and 25 to release braking spindles, one of which is indicated at 26 in Figure 6, for movement into braking engagement with the turntable 12 and to retract the spindles to allow rotation of the turntable.

The upper table 11 is carried for limited transverse sliding on the turntable 12 and it is adjusted transversely and held in its adjusted positions by screws 30 threaded through the table 11 and into engagement with an annular surface on the turntable 12. In order to allow transverse adjustments of the table 11 when heavy parts are supported thereon an annular groove or chamber 31 is provided in the upper surface of the turntable and air can be supplied to this groove through a conduit 32 for lifting the table 11 about the turntable 12 on an air cushion to allow easy transverse movement therebetween. The table 11 is provided with radial T slots to allow the fastening of parts in position as expedient and concentric circular markings are provided on the surface of the table so that parts can be readily centered thereon. The upper surface of the spacer 15 is similarly provided with such markings for part centering.

The base 14 has a vertical extension 35 which provides slideways along which a slide 36 can be vertically positioned. A spring urged roller 37 carried by the slide 36 engages the vertical column 35 and maintains the slide 36 in engagement with a corner 38 of the column and in engagement with the slideways for its vertical guiding and support. The slide 36 has a nut member 40 fixed thereto and a lead screw 41 is threaded into the nut 40 for vertical adjustments of the slide 36. A hand wheel 42 drives through a chain 44 and a pair of bevel gears 45 and 46 to rotate the lead screw 41 for the vertical slide movement. A support 47 in which a shaft 18 is journaled for rotation is carried from the slide 36 through a resilient hinge connection 50. A knob 51 serves to rotate a screw 52 threaded through a projection on the support 47. Screw 52 engages the slide 36 and serves to swing the axis of the support 47 and shaft 18 in a horizontal plane about the resilient hinge connection 50. The arm 17 is mounted by sliding onto the shaft 18 and screws 55 indicated in Figure 4 pass through cooperating flanges on the sweep arm 17 and the shaft 18 to detachably fix the arm 17 in position.

Gauge head 16 is supported in a tube 56 fixed in adjusted radial positions relative to the arm 17 for different size and differently conformed parts by means of a set screw 57. The vertical adjustments of the slide 36 and the shaft 18 are gauged by a gauge head 20 supported in a tube 58 vertically adjustable relative to the base 14 to fixed positions and held by a set screw 60. It will be noted that the length of tube 56 is sufficient to allow its extension to dispose gauge head 16 on the other side of the axis of shaft 18 with its work contactor directed away from the shaft axis for also gauging concavely curved surfaces.

The gauge heads 16 and 20 as illustrated are of the air leakage flow type. The gauge head 16 is typical of the gauge heads employed and is shown in Figure 7 mounted in the tube 56. This gauge head employs a work contactor 61 which engages the work and positions the tapered inner end of a plunger 62 within an opening 64 in the gauge head to control the flow of air from conduit 65 escaping through the gauge head to atmosphere. Plunger 62 is normally spring biased outward relative to the gauge head. A suitable indicating instrument is illustrated in Figure 8 and is of the type employing a vertically disposed transparent flow tube having an internal taper along which an indicating float positions itself in accordance with the velocity of flow upward through the flow tube. The lefthand flow tube of the instrument of Figure 8 is connected through a conduit 65 leading to gauge head 16. Air under controlled pressure is supplied to the lower end of the flow tube, flows up through the tube and to conduit 65 which leads to gauge head 16 where the flow is controlled in accordance with movements of work contactor 61. The righthand flow tube similarly connects to conduit 66 which leads to gauge head 20.

Figure 9 illustrates a modified gauge head carrying structure shown as employed in gauging an inside radius of a concavely curved surface on a part. The gauge head supporting tube is carried by a member 70 slidable along flanges on a swinging arm 75 to adjusted positions held by clamping screw 76. This apparatus is also adaptable for gauging both convexly and concavely curved part surfaces.

In view of the previous description of the structural components of the present apparatus it is thought that the following description of the set-up and gauging operations, as particularly applied to the apparatus of Figures 1 to 3, is now in order. In the initial step of set-up a locating rod 71 is inserted through the table 11 and into the turntable 12. The slide 36 is lowered and the contact of the gauge head 16 is brought in turn into engagement with opposite sides of the locating rod 71 as indicated at 72 and 74 in Figure 1. If the indicator readings are not equal at the two dispositions of the gauge head 16, the screw 52 is turned to swing the arm support 47 about the connection 50 until the axis of shaft 18 passes through a vertical continuation of the axis of rotation of the turntable 12. Following this the locating rod 71 can be removed or, if the spacer 15 is being employed as in gauging a convex surface, the spacer can be mounted on the table 11 over the locating rod 71. However, if an inside radius is being gauged, the spacer 15 is not used, the locating rod 71 is removed, and the part is mounted directly on the table 11.

In gauging the convexly curved surface of part 10 spacer 15 is then centered on the table 11 and the part is placed on the upper surface of the spacer. Using the scribed circles on the upper surface of the spacer 15 the part is located in gauging position with its center at the center of the spacer. This adjustment is sufficient for the centering of the part in a general direction along the axis of shaft 18. However, the location of the part along a line perpendicular to the axis of shaft 18 is critical in gauging. To insure that the part is accurately centered transverse the axis of pivoting the gauge head 16 is first brought into engagement with one side of the part and the indicator reading is noted. The turntable 12 is then rotated 180 degrees to bring the gauge head 16 into engagement with the part at a point at a diametrically opposite location. If the indicator readings are not equal at these two positions of the part the adjustment screws 30 are used to slide the table 11 along the turntable 12, using the air cushion if necessary, until the readings of the indicator associated with gauge head 16 are equal when the gauge head is gauging at diametrically opposite points on the part. At this time the part is centered along the critical axis transverse the axis of gauge head swinging and the brake lever 21 is rotated to release the spindles 26 and brake the turntable 12 against rotation.

Assuming that the lower surface of the segment 10 has been chosen as a reference the hand wheel 42 is employed to vertically adjust the slide 36 to bring the axis of shaft 18 at the vertical level of the theoretical location of the center of curvature relative to the lower surface of segment 10. In this example the shaft axis is at the upper level of the spacer 15. The height gauge 20 is brought into engagement with the shaft 18 through adjustment of tube 58 and the associated indicating float in the instrument of Figure 8 is brought to a zero position. Using gauge blocks or the like on the spacer 15 the gauge head 16 is positioned and its associated indicator is adjusted until the indicator reads zero with a surface curvature of nominal radius centered on the pivot axis. Masters can also be employed for this purpose.

During gauging the hand wheel 77 is used to rotate the shaft 18 and oscillate or sweep the gauge head contactor 61 along the curved surface of the segment. It will be appreciated that if the axis of shaft 18 does not lie at the vertical level of the actual center of curvature of the part surface the indicator associated with the gauge head 16 will oscillate up and down as the contactor 61 traverses the part. Using this characteristic reaction of the indicator the hand wheel 42 is rotated to vertically positon slide 36 until the indicator maintains a constant position throughout the traverse of the contactor 61 along the part surface. At this time the axis of shaft 18 is also situated in a vertical position relative to the actual center of curvature of the part surface.

The position of the indicator associated with gauge head 16 when the indicator position remains stationary throughout the traverse will then indicate the deviation of the actual part curvature radius from the nominal radius. A reading of the indicator associated with the height gauge 20 will indicate the necessary adjustment of the shaft 18 and the disposition of the radius center from the reference lower surface of the segment 10 as it differs from that initially set. Thus through the gauging apparatus of this invention the radius of curvature of the part is precisely determined and the location of the center of the curvature relative to the part is also measured. It will be apparent that any part can be similarly gauged by initially assuming a radius and center location, if necessary.

In an application to gauging the inside radius of a concavely curved part with either the apparatus of Figures 1 to 3 or that of Figure 9, the above steps are similarly followed.

In general in the illustrative apparatus a part which would have its curvature center below the apparatus surface on which the part is supported for gauging would be mounted on the spacer 15. If the curvature center were above the supporting surface the part would be mounted directly on turntable 11.

Because of the unique interrelationship between the two gauge heads employed the radius of curvature of a surface on a part and the disposition of the center of the surface curvature can be precisely determined. By application of the teachings of this invention both inside radii of concavely curved surfaces and outside radii of convexly curved surfaces can be gauged. Because of the simple gauging indication responses and the few adjustments necessary an inexperienced operator can make highly precise gauging operations without difficulty. The machine is formed of a few rugged components and is useful for a long service life in repeated accurate gauging.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An apparatus for gauging an arcuate surface, said apparatus comprising a base, a turntable carried on said base for rotation on said base to adjustably fixed positions, means for mounting a part to be gauged on said turntable, a horizontally disposed shaft, a gauge head, a sweep arm fixed to said shaft, means carrying said gauge head from said sweep arm for radial adjustment, a slide, means carrying said slide from said base for vertical adjustment, means carried from said slide supporting said shaft for rotation including adjustable means for movements of said shaft transverse its axis in a horizontal plane to locate the shaft axis in a vertical plane including the center of curvature of the surface being gauged, and gauging means for gauging the vertical adjustments of the slide in a gauging operation.

2. An apparatus for gauging an arcuate surface on a part, said apparatus comprising a base, a turntable carried from said base for rotation about a vertical axis, controllable brake means cooperating between said base and said turntable, a part supporting table mounted on said turntable for limited transverse movements relative thereto, adjustable means cooperating between said table and said turntable for adjusting the table to fixed positions relative to the turntable, a chamber in one of the adjacent surfaces between said table and said turntable and means for supplying air under pressure to said chamber to partially elevate said table and allow easy transverse adjustments thereof, a gauge head, an indicating means connected to said gauge head and continuously responsive thereto, means mounting said indicating means at a remote fixed location for ready observance by the operator, means carrying said gauge head from said base for swinging movement about a pivot axis and along the part surface, said carrying means including adjustable means for adjustably positioning the pivot axis horizontally and vertically relative to the part in gauging, and a gauging means cooperating between the carrying means and the base to gauge the adjustments of the adjustable means during a gauging operation.

3. An apparatus for gauging an arcuate surface, said apparatus comprising a base, a turntable, bearing means cooperating between said turntable and said base and supporting said turntable for rotation about a vertical axis, controllable brake means cooperating between said turntable and said base, means for mounting a part to be gauged on said turntable, a vertical column extending upward from said base, a slide, cooperating ways between said slide and column on which the slide is vertically movable, means cooperating between said base and said slide for adjustably positioning said slide, a shaft, a shaft mount in which said shaft is journaled for rotation about a horizontal axis, a hand wheel attached to said shaft at one end thereof and an arm fixed to said shaft at the other end, a vertical hinge mount between said shaft mounting means and said slide for swinging movements of said shaft mount relative to said slide about a vertical axis, adjustable screw means cooperating between said shaft mount and said slide for adjustable swinging of the shaft axis about the hinge axis to fixed positions, a gauge head comprising a work contactor, means adjustably fixing said gauge head to said arm for movement to adjusted radial positions, and gauging means cooperating between said base and said shaft mount for gauging the vertical adjustments of said slide and shaft in a gauging operation.

4. Apparatus for gauging convex and concave segmental spherical surfaces on a part comprising a base, a support on said base carrying a part for adjustable rotation about an axis of curvature of the surface to be gauged, a gauge head, a pivot support on said base having a pivot axis transverse to the axis of part rotation, a carrier swingable on said support about said pivot axis carrying said gauge head for measurement along a line diametral to the axis of swinging and movement along the part surface in a diametral plane thereof, said pivot support including extended guide means transverse the swinging axis for adjustably positioning the axis through a wide range relative to said base and a part supported thereby, said carrier including means for rectilinear adjustment of said gauge head along said diametral line to either side of the swinging axis whereby the gauge head is directed away from or toward the swinging axis for measuring convex or concave surfaces.

5. An apparatus as set forth in claim 4 further comprising gauging means cooperating between said base and said pivot support for measuring the disposition of the pivot support relative to a part carried by said base.

6. An apparatus for locating the center of curvature of a spherically formed surface on a part relative to a reference surface on the part and for gauging the curvature of the surface comprising a base, a work carrying table on which the reference surface of the part can be applied, bearing means supporting said table on said base for movement about an axis of rotation, adjustable means for shifting said table transverse said axis to locate a part so that the center of curvature of the part is concentric with the axis of table rotation, a holder adjustably mounted on said base for movement transverse of said reference surface, a carrier supported by said holder for swinging movement about a pivot axis transverse the axis of table rotation, a gauge head on said carrier for swinging movement therewith along the part surface including a gauging contact movable radially of the pivot axis, and gauge means for measuring the disposition of said pivot axis relative to said base to determine the distance between the pivot axis and said reference surface.

7. An apparatus for precisely determining the location of the center of curvature of a spherically curved surface on a part relative to a reference surface thereof, comprising a base, a support on said base for carrying the reference surface of a part to be gauged, a gauge head having a movable contactor for positioning engagement with the surface of the part, a support on said base carrying said gauge head, said supports including means for relative pivoting between the part and said gauge head about an axis approximately coincident with the center of curvature of the part to tram said contactor along the part surface in a diametral plane thereof, said contactor being movable radially of said axis, gauging means connected to said gauge head continuously responsive to gauging movements of said contactor, said supports including means for relatively adjusting the part rectilinearly transverse said pivoting axis to place said pivoting axis exactly coincident with the center of curvature of the part as determined by the response of said gauging means, further gauging means to measure the spacing between said pivoting axis and the reference surface of the part to determine the disposition of said center of curvature relative to said reference surface, said supports further including means for relatively rotating the part and gauge head about an axis transverse said pivoting axis whereby the part can be readily measured in a plurality of angularly related gauging planes.

References Cited in the file of this patent

UNITED STATES PATENTS

| | | |
|---|---|---|
| 1,997,639 | Hetherington | Apr. 16, 1935 |
| 2,010,144 | Dunden | Aug. 6, 1935 |
| 2,066,699 | Skelton | Jan. 5, 1937 |
| 2,466,380 | Clark | Apr. 5, 1948 |
| 2,476,361 | Elliott | July 19, 1949 |
| 2,504,961 | Braaten | Apr. 25, 1950 |
| 2,599,835 | Johnson | June 10, 1952 |
| 2,623,294 | Fox | Dec. 30, 1952 |
| 2,680,912 | Wylie | June 15, 1954 |
| 2,712,181 | Mahlmeister | July 5, 1955 |
| 2,723,461 | Reason | Nov. 15, 1955 |

FOREIGN PATENTS

| | | |
|---|---|---|
| 634,186 | Germany | Aug. 22, 1936 |
| 840,445 | Germany | June 9, 1952 |
| 706,834 | Great Britain | Apr. 7, 1954 |